Figure 4:
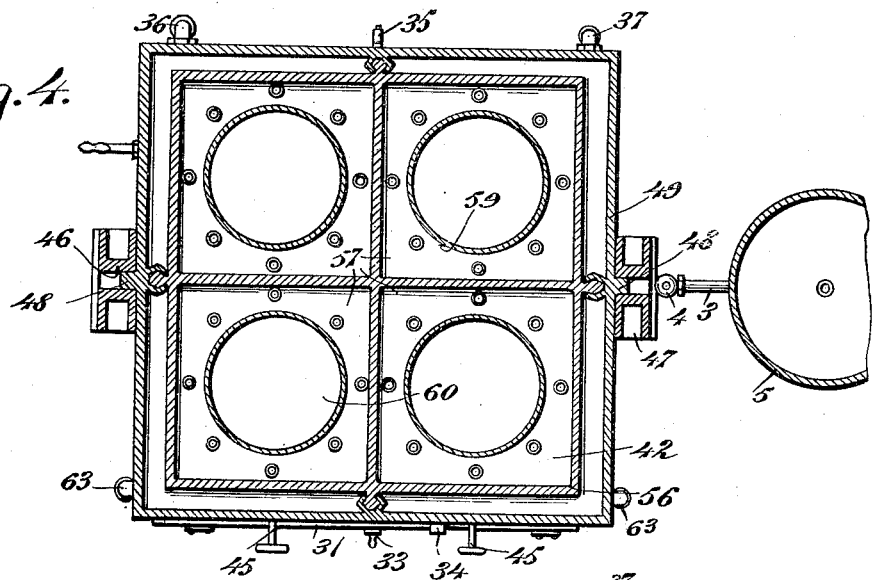

L. D. RICKER.
COOKER.
APPLICATION FILED JAN. 24, 1913.
1,121,401.
Patented Dec. 15, 1914.
4 SHEETS—SHEET 1.
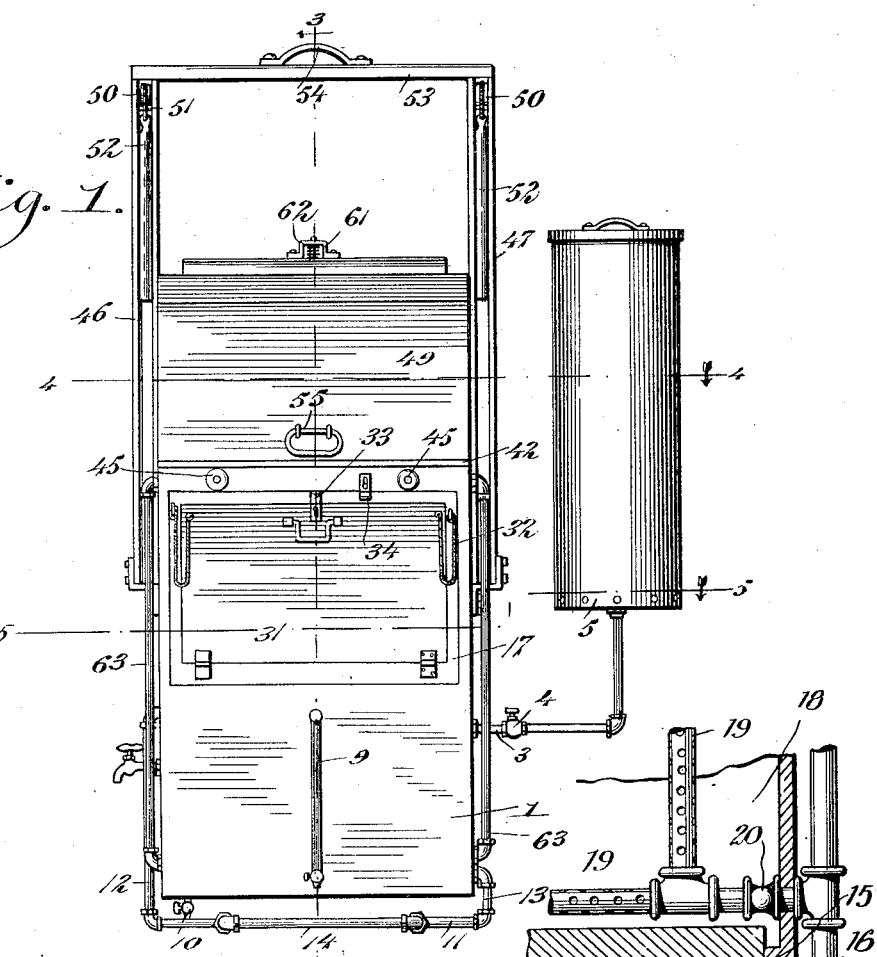
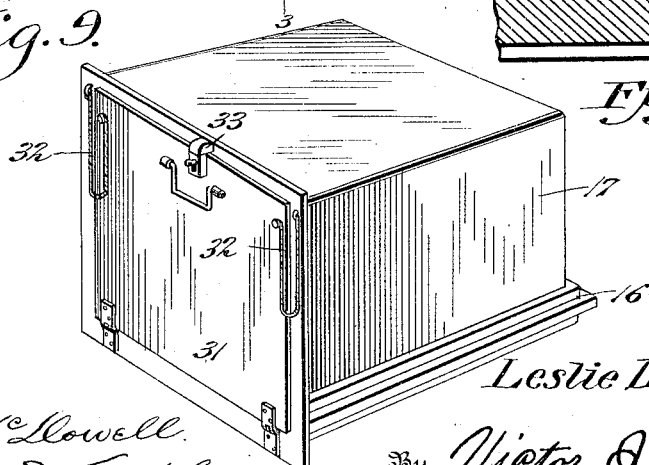
Witnesses
W. S. McDowell
Wm. North
Inventor
Leslie D. Ricker
By Victor J. Evans
Attorney

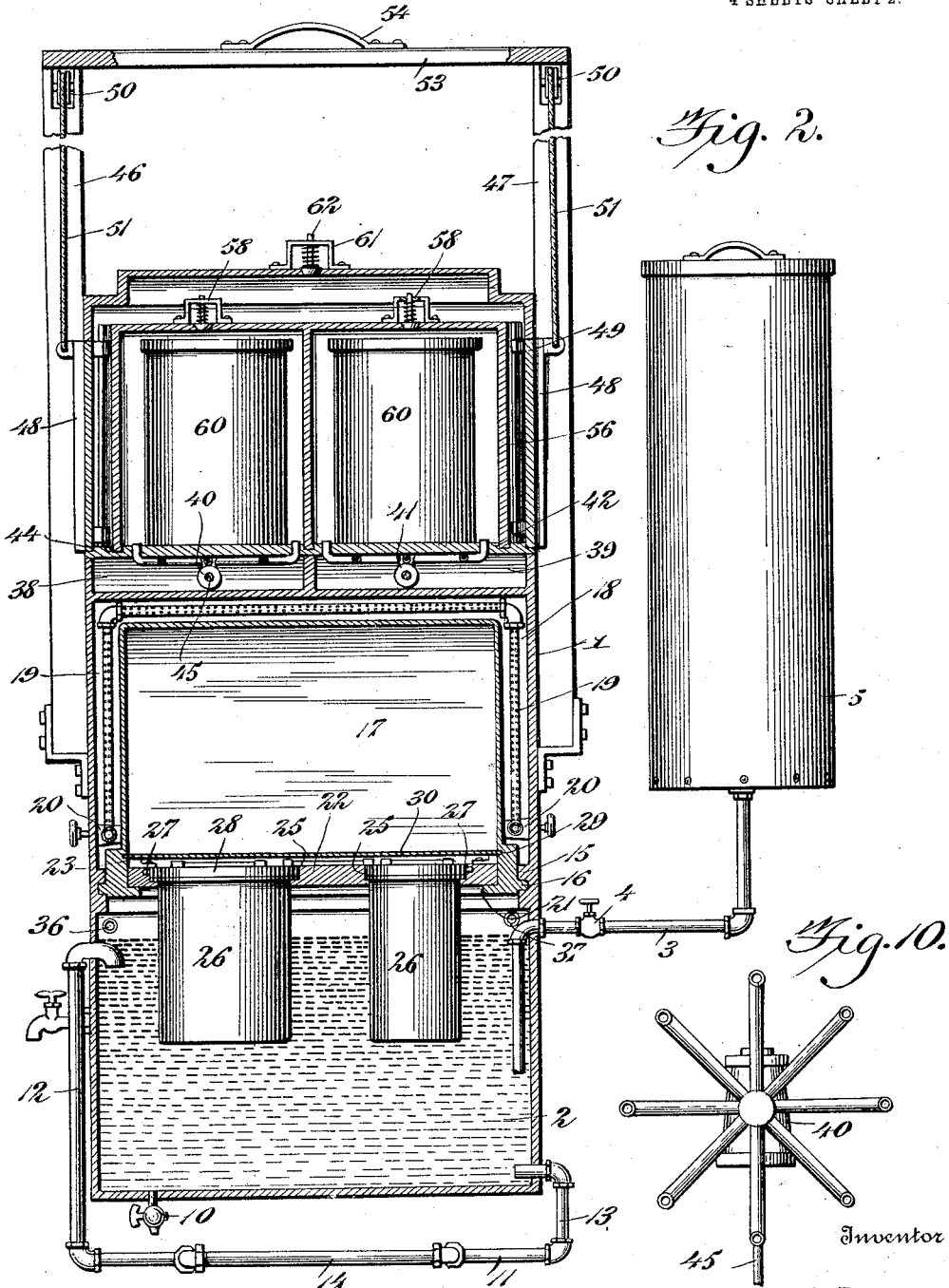

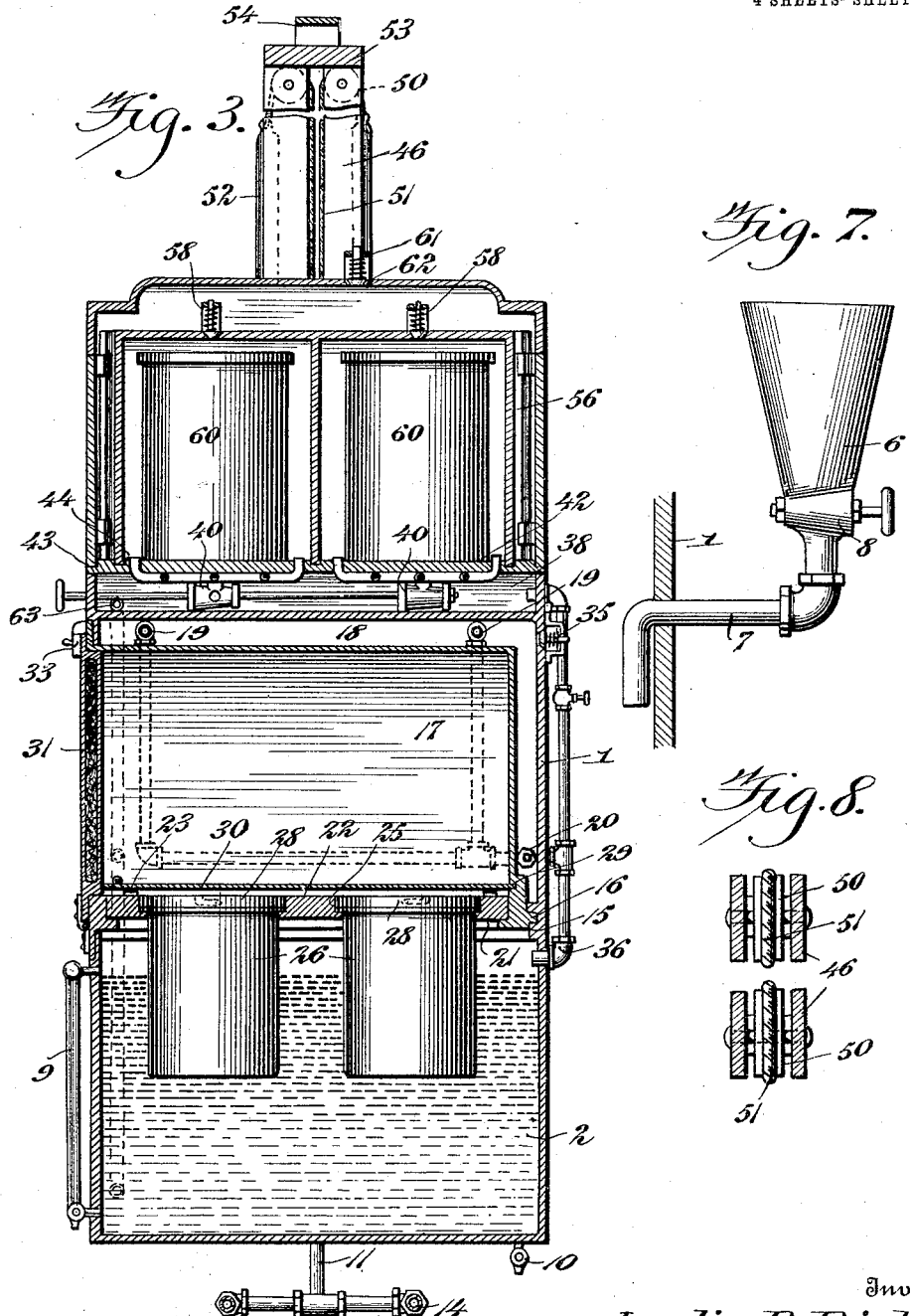

L. D. RICKER.
COOKER.
APPLICATION FILED JAN. 24, 1913.

1,121,401.

Patented Dec. 15, 1914.
4 SHEETS—SHEET 4.

Inventor
Leslie D. Ricker

Witnesses

By Victor J. Evans
Attorney

UNITED STATES PATENT OFFICE.

LESLIE D. RICKER, OF COLLBRAN, COLORADO.

COOKER.

1,121,401. Specification of Letters Patent. Patented Dec. 15, 1914.

Application filed January 24, 1913. Serial No. 744,032.

*To all whom it may concern:*

Be it known that I, LESLIE D. RICKER, a citizen of the United States, residing at Collbran, in the county of Mesa and State of Colorado, have invented new and useful Improvements in Cookers, of which the following is a specification.

The present invention relates to improvements in cooking devices.

In carrying out my invention it is my purpose to provide a simple, cheap and efficient steam cooker and heater, primarily intended for use in hotels, lunch rooms or the like, whereby eatables of different classes, such, for instance, as those requiring baking or boiling, may be simultaneously cooked.

I also aim to provide a device of this class wherein steam, generated from water contained in a suitable reservoir may be circulated around a suitable oven, the device being further provided with a warming chamber arranged above the said oven, the chamber being divided into compartments, and means, comprising valves, being employed to permit of the entrance of steam, in any desired quantity to any or to all of the said compartments.

Another object of the invention is the construction of a suitable casing having a water inlet as well as a circulating pipe which has a heart or a coil arranged below the bottom of the casing and adapted to rest upon a heat imparting device, such as a gas stove, or the like, whereby the water within the chamber will generate steam which may be admitted to a space provided between the casing and an oven, the reservoir being further provided with steam pipes which are arranged directly below a reticulated member and which are governed by suitable valves, the said recticulated member being adapted to receive food containers and the casing being further provided with a hood having compartments, within which are arranged food containers, the devices being provided with means whereby the said hood may be raised above the containers or lowered to inclose the said containers.

A still further object of the invention is to provide a cooker of this class with means whereby water may be let into the reservoir and the amount therein readily determined, the reservoir being further provided with suitable faucets or pipes whereby the water when heated or the steam generated by the heated water, may find an outlet at the reservoir or may be conveyed to a suitable distance from the reservoir for any desired purpose.

With the above, and other objects in view, the invention resides in the novel construction, combination and operative arrangement of parts, set forth in and falling within the scope of the appended claims.

Figure 5:
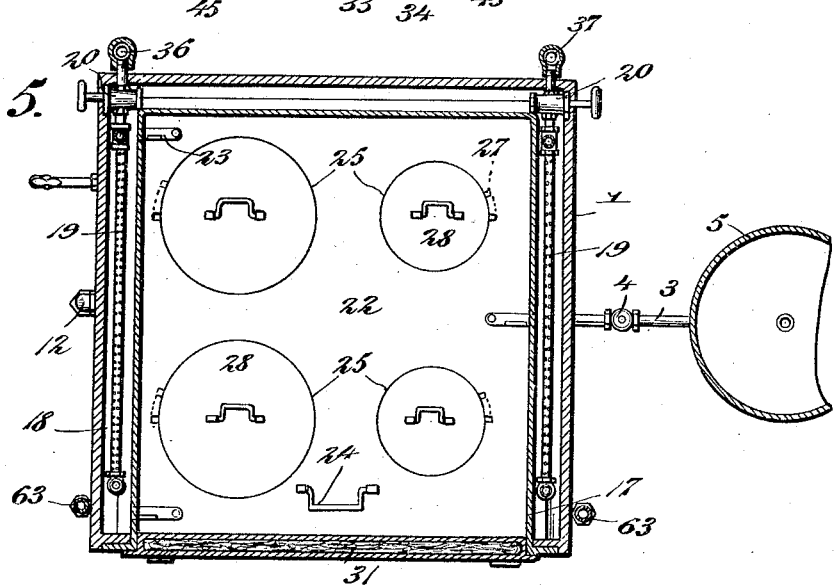
Figure 6:
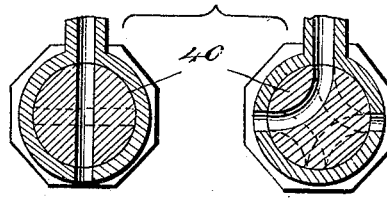

In the drawings, Figure 1 is a front elevation of the device constructed in accordance with the present invention. Fig. 2 is a vertical longitudinal sectional view. Fig. 3 is a sectional view taken at a right angle to the showing illustrated in Fig. 2. Fig. 4 is a horizontal sectional view upon the line 4—4 in Fig. 1. Fig. 5 is a similar sectional view upon the line 5—5 in Fig. 1. Fig. 6 illustrates detail sectional views of valves which may be employed. Fig. 7 is a side elevation of a funnel which may be employed in lieu of the water tank. Fig. 8 is a detail transverse sectional view taken through the standard 46 directly above the pulleys 50. Fig. 9 is a perspective view of the oven detached. Fig. 10 is a top plan view of the series of radiating pipes connected with the pipe controlled by the valves 40 and 41. Fig. 11 illustrates a detail.

In the structure illustrated in the drawings the cooker is provided with a support which comprises, what is commonly termed, a heart or a series of water circulating pipes which is adapted to be positioned directly over the flames of a gas stove or to receive heat from any other desired source. The cooker embodies a casing 1, the same being, of course, constructed of some suitable heat retaining material. The casing which is preferably of a rectangular formation, but may, of course, be of any other desired shape, has its lower portion water-tight to provide, what I shall term, a reservoir 2. Leading to the reservoir and controlled by a suitable cock 3 is an inlet pipe 4 which is connected with any suitable source of water supply, such as a tank 5. It is, of course, to be understood that the cooker may be constructed in various sizes and when the said cooker is of a comparatively small size a funnel 6 provided with an inlet pipe 7 which is controlled by a cock 8, may be substituted in lieu of the tank 5. The inlet pipe to the reservoir is arranged adjacent the top thereof but is extended toward the bottom and terminates adjacent the said bottom as clearly illustrated in the drawings. The reservoir is provided with a water glass 9, whereby the amount of water received within the reservoir may be readily determined. The reservoir is further provided with an outlet cock 10, whereby the water from the said reservoir may be drained when occasion requires.

The numeral 11 designates the circulating pipe for the reservoir. This pipe is arranged both below and upon the opposite sides of the said reservoir, and has one of its branches 12 entering the top of the reservoir while its opposite branch 13 enters the bottom of the reservoir. The lower or connecting member of the circulating pipe 11 is in the form of a heart or is made of a plurality of connected radiating pipes 14, and the said heart 14 presents a flattened surface, which is horizontally straight with relation to the bottom of the reservoir, and the said heart provides a support for the reservoir so that the receptacle may be supported over the flames of a gas stove, cook stove, electric heater, or the like. By such an arrangement it will be noted that the water circulating through the pipe 11 will be quickly heated so as to generate steam from the said water so that the amount of water within the reservoir is not only constantly retained at a boiling point, but that the steam generated therefrom may be employed for a purpose now to be described.

The casing above the reservoir has its walls doubled. The casing directly above the reservoir is provided with cleats 15 which form ways for flanges 16 which are provided upon the lower walls of a removable oven 17. The oven 17 is provided with offset portions upon which are formed the flanges 16 so that a space 18 is arranged between the said oven and the casing. Arranged within this space 18 are perforated pipes 19, which are controlled by suitable valves 20, and which communicate with the reservoir 2 directly above its water level, and whereby, when the valves are operated the steam will be circulated around the passage 18 to impart sufficient warmth to the oven to permit of the cooking of food stuff within the oven.

The oven 17 is provided with an open bottom, the same having a continuous flange 21, and this flange is adapted to support a removable member or false bottom 22. The bottom 22 has its upper face provided with pivotal catches 23 which engage within suitable openings provided in the sides of the oven to retain the said bottom normally upon the flange 21 of the oven, and the said bottom may be provided with handles or bails 24 (see Fig. 5) whereby the bottom may be readily lifted from the oven. The bottom is further formed with a series of openings 25, the same having lower flanged walls to provide supports for the flanged or beaded edges of suitable utensils 26. The top of the false bottom is further provided with bayonet slots which are arranged upon the side walls provided by the openings 25, the said bayonet slots being adapted to receive pintles 27 provided upon the flanged edges of removable closures 28 for the receptacles 26. By such an arrangement it will be noted that food-stuff, to be boiled, may be placed within any of the utensils 26, while at the same time, articles to be roasted may be placed in the oven proper and all cooked simultaneously. In order to prevent the odor from the cooking foodstuffs in the utensils 26 from impregnating the roasted articles in the oven, I have provided the oven, above the flange 21, with a depression or way 29 which is adapted to receive a removable plate 30. The outer and open face of the oven is provided with a hinged door 31, the same being flanged to afford a tight connection with the said oven. This door is preferably hinged at its lower edge, and secured to the door and to the oven is a flexible element 32 which limits the downward swinging movement of the door to sustain the said door in a substantially horizontal open position so that the articles in the oven may be removed or inserted as well as to permit of the sliding of the plate 30 when any one of the utensils 26 is to be removed or to be positioned upon the false bottom 22. The door is sustained in its closed position through the medium of pivoted latches 33. The oven has its outer face flat, and has a flange which is adapted to be received within a suitable recess provided in the outer face of the casing 1. The oven is removable, but is normally sustained in proper position within the casing through the medium of suitable latches 34, and it may here be stated that the oven is only removed when access to the reservoir is desired.

The top wall of the reservoir is formed with a depression or pocket with which communicates a safety valve 35, so that if excess steam be admitted within the space 18 around the oven 17, the same may escape through the said valve.

The numerals 36 and 37 designate pipe members which communicate with the reservoir above the water level thereof and which may also communicate with the pipes 19 if desired. These pipes communicate with compartments or chambers 38 and 39, respectively, and each of the said compartments is regulated by valves 40 and 41, respectively. Arranged above the top of the casing 1 and communicating, through the medium of suitable pipes with the compartments 38 and 39, is a reticulated member 42. This member is of a size substantially equaling that of the top of the compartment and the said member is provided adjacent to its edges with a continuous flange 43. The member is further provided with right-angularly arranged depressions 44 whereby the said plate is divided, in the present instance, into what may be termed four distinct sections. The valves 40 and 41 are what may be termed, three-way valves, that is the handles or keys 45 of either of the valves may be rotated a predetermined distance to permit of the admission of steam, say within one of the sections of the reticulated plate, and by rotating the valve still farther the steam may be cut off of this section and allowed to pass within the back or second section of the reticulated plate. Again, the valve may be rotated so as to permit of the admission of steam to either of the plates, and still again the valve may be rotated to prevent the admission of steam to all of the sections provided by the reticulated plate.

The casing 1 has two of its sides arranged with diametrically opposite standards 46 and 47, respectively. What may be termed the outer faces of each of the standards is channeled, as clearly illustrated in the figures of the drawings, and each of the said standards comprises a pair of sections, the space between each of the said pairs of sections providing ways for the reception of tongues 48 provided upon the opposite sides of a hood 49. Each of the sections comprising the standards 46 and 47 have their upper extremities bifurcated, and trunnioned within each of the said bifurcations is a grooved wheel 50. Each of the tongues 48 is provided with flexible members 51 which pass over the grooved wheels 50 and which have their free ends connected with weights 52 which are disposed within the channels of the standards and the said weights serve as a compensating balance for the hood to permit of the said hood being raised or lowered at a minimum amount of physical exertion. The standards are connected through the medium of a suitable bar 53, and the said bar may be provided with a bail or handle 54, whereby the device may be transported when desired.

The hood 49 embodies both an outer casing which is provided with handles 55 and a removable inner casing 56 which has a closed top and an open bottom. The inner casing 56 is divided into compartments 57, corresponding in number to the divisions provided by the depressions 44 upon the reticulated member 42. Each of these compartments 57, has its upper wall provided with a regulating valve 58, and the divisions upon the plates 42, which may be designated by the numerals 59, are each adapted to support a suitable receptacle or container 60 within which is placed food either to be warmed or cooked. In this connection it is to be understood that any amount of steam may be admitted to the divisions 59 of the plate 42, and, it being understood that the compartments 57 of the hood being arranged so as to receive the containers 60, when the hood is in its lowered position, the articles of food within the said containers may receive the desired amount of heat either for warming the contents of the containers or for cooking the same, as desired.

Arranged upon the hood 49 is a cap 61, the same providing what may be termed a chamber between the top of the inner casing 56 of the said hood, and the cap 61 is provided with a safety valve 62 which serves as a means of escape of the steam when an overpressure thereof passes from the compartments 57 through their valves 58. By providing the hood with both the inner and outer casings, the surplus steam escaping from any one of the compartments will circulate within the space provided between the said casings, thus providing a substantially continuous circulation of the steam around the compartments.

In order to provide for the condensation of the steam from the compartments 38 and 39, I provide a pipe 63 which leads from the said compartments to the reservoir 2.

From the above description, taken in connection with the accompanying drawings, the simplicity of the device, and the advantages thereof, as well as its cheapness in construction, will, it is thought, be perfectly apparent to those skilled in the art to which such inventions appertain, without further description thereof.

Having thus described the invention what I claim is:—

1. A steam cooker including a casing provided with a water reservoir, a removable oven arranged above the reservoir and spaced away from the casing to provide a steam passage, means for admitting and controlling steam from the reservoir to the said passage, an oven having an open flanged bottom, a false bottom for the oven, said false bottom adapted to removably support a plurality of utensils to sustain the bodies of the same within the reservoir, removable closures for the receptacles, and a slidable plate arranged above the false bottom and covering the false bottom.

2. A cooker of the class set forth including a casing provided with a water reservoir and means for heating the water within the reservoir, the casing above the reservoir having an open face, a removable oven arranged above the reservoir and closing the open face of the casing, the said oven being spaced away from the remaining walls of the casing, means for retaining the oven upon the casing, the said oven being provided with an open bottom, a false bottom for the oven, means for securing the false bottom to the oven, the said false bottom having a plurality of openings adapted to receive receptacles, means for removably sustaining the receptacles upon the bottom, a sliding plate within the oven and disposed above the false bottom, the space between the sides of the oven and the receptacle being provided with reticulated pipes which communicate with the reservoir above the water level thereof, valves for these pipes, and a hinged door for the oven.

3. A steam cooker comprising a casing and including a water reservoir, an oven arranged above the reservoir and spaced from the casing, pipes within the said space communicating with the reservoir above the water level thereof, valves for these pipes, the top of the casing being provided with compartments, pipes leading from the reservoir and communicating with the compartments, valves for the compartments, a reticulated plate above the compartments and communicating therewith, and a hood for the plate.

4. In a steam cooker, a casing, said casing being provided with a steam generating reservoir, an oven arranged above the reservoir and spaced away from the sides of the casing, perforated pipes arranged between the casing and the oven, valves for these pipes, the top of the casing being provided with compartments, pipes leading from the reservoir and communicating with the compartments, valves for the compartments, a reticulated plate divided into sections arranged above the compartments, the said valves being so arranged as to admit a fluid to either or all of the sections of the plate, a slidable hood arranged above the casing, and the said hood being divided into compartments corresponding in number and size with the divisions of the reticulated plate.

5. A steam cooker embodying a casing having a water reservoir, an oven arranged above the reservoir disposed away from the sides of the casing, valve controlled means for permitting of a circulation of fluid from the reservoir through the space between the oven and the casing, the top of the casing being provided with compartments, a reticulated plate divided into sections arranged above the compartments, pipes for the reservoir communicating with the compartments, valves for regulating the admission of fluid from the compartments through the perforations of the plate, a slidable hood for the plate, said hood comprising an inner and an outer casing spaced from each other, the inner casing being divided into compartments corresponding in number to the sections of the reticulated plate, and each of the said compartments being provided with a pressure valve.

6. A steam cooker including a casing provided with a steam generating chamber forming a water reservoir, an oven arranged above the reservoir, means for permitting the circulation of fluid between the casing and the oven, the top of the casing being provided with compartments, a reticulated plate upon the top of the casing and above the compartments, pipes communicating with the generating chamber and with the compartments, valves within the compartments and adapted to control a flow of fluid from the compartments through the reticulated plate, a vertically slidable hood for the reticulated plate, said hood comprising an inner and an outer casing, the inner casing being divided into compartments, each of the said compartments being provided with a regulating valve, a cap for the hood, and said cap being provided with a pressure valve.

7. A steam cooker including a casing provided with a water reservoir forming a generating chamber, an oven, means for permitting and regulating a circulation of fluid from the steam chamber between the oven and the casing, steam compartments provided upon the top of the casing, pipes communicating between the said steam compartments and the reservoir, a plate arranged above the compartments and being provided with openings communicating therewith, valves for the compartments, standards arranged in pairs upon the casing and projecting thereabove, a hood provided with tongues disposed between the spaced standards, said hood embodying an inner and an outer casing, the inner casing being provided with regulating valves, a cap for the casing, said cap being provided with a safety valve, standards having their upper extremities provided with grooved wheels, flexible elements connected with the tongues and passing over the grooved wheels, compensating weights for the flexible elements, and a connecting bar provided with a bail for the standards.

In testimony whereof I affix my signature in presence of two witnesses.

LESLIE D. RICKER.

Witnesses:
C. B. PITTS,
JOSEPHINE NEEDLES.

Copies of this patent may be obtained for five cents each, by addressing the "Commissioner of Patents, Washington, D. C."